(12) United States Patent
Walterscheid (10) Patent No.: US 6,753,062 B1
(45) Date of Patent: Jun. 22, 2004

(54) UPHOLSTERY PAD AND METHOD

(75) Inventor: Wade J. Walterscheid, Rosston, TX (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/491,304

(22) Filed: Jan. 25, 2000

(51) Int. Cl.[7] ................................................ B32B 3/10
(52) U.S. Cl. ........................... 428/99; 428/68; 428/71; 428/76; 428/158; 428/159; 428/138; 428/77; 428/189; 428/190
(58) Field of Search ........................... 428/71, 99, 137, 428/138, 172, 68, 76, 158, 159, 77, 189, 190; 297/225, 219.1, DIG. 1

(56) References Cited

U.S. PATENT DOCUMENTS

| | | | | |
|---|---|---|---|---|
| 3,795,722 A | * | 3/1974 | Sassaman | 428/71 |
| 4,377,609 A | * | 3/1983 | Bartoli et al. | 428/71 |
| 4,480,715 A | * | 11/1984 | Brooks | 428/71 |
| 5,082,310 A | * | 1/1992 | Bauer | 428/71 |
| 5,501,890 A | * | 3/1996 | Mills | 428/68 |

* cited by examiner

Primary Examiner—Alexander S. Thomas
(74) Attorney, Agent, or Firm—Sidley Austin Brown & Wood LLP

(57) ABSTRACT

An upholstery pad has a panel with a hinging axis that divides a fixed portion of the panel from a flap of the panel. The flap is continuously pivotable about the hinging axis between a relaxed position and a biased position. The panel assembled into the upholstery pad along with one or more padding members and a sheet of an upholstery-type material, a force is created within the upholstery pad which urges the flap to pivot toward the relaxed position when the flap is pivoted toward the biased position. This force, in combination with friction between the sheet and a substructure, retains the upholstery pad in place with minimal other mechanical fastening, if any.

41 Claims, 7 Drawing Sheets

UPHOLSTERY PAD AND METHOD

FIELD OF THE INVENTION

This invention is directed generally to an upholstery pad for facing interior surfaces of a vehicle. In one aspect, this invention relates to an upholstery pad with features which allow a reduced number of fasteners for fastening the upholstery pad to a surface.

BACKGROUND OF THE INVENTION

Interior walls of vehicles are typically faced with upholstery pads. These pads improve the aesthetic characteristics of the interior space of the vehicle as well as reduce the transmission of noise into the interior space of the vehicle. An upholstery pad is generally attached to an interior wall substructure of a vehicle by using mechanical push-type fasteners (e.g., "Christmas tree" fasteners). In order to fasten an upholstery pad in this way, some type of wall structure must be provided behind attachment areas of the upholstery pad into which fasteners can be installed. Typically, a U-channel or other structure must be provided in all attachment areas for this purpose, which increases the complexity and cost of the vehicle assembly. Further, the interior of a vehicle can be made more attractive by decreasing the number of exposed fasteners which attach upholstery pads to the vehicle cab substructure.

A need exists, therefore, for an improved upholstery pad for facing the interior walls of a vehicle that requires a reduced number of mechanical fasteners for installation and thus can decrease the requirement for substructure behind particular areas of the upholstery pad. A need also exists for an improved upholstery pad which requires a reduced number of mechanical fasteners for installation, thus improving the appearance of the vehicle interior.

BRIEF SUMMARY OF THE INVENTION

The present invention is a new and advantageous upholstery pad for facing interior surfaces of a vehicle.

One object of the present invention is an upholstery pad for facing interior surfaces of a vehicle which requires a reduced number of mechanical fasteners for installation.

Another object of the present invention is an upholstery pad for facing interior surfaces of a vehicle which requires no mechanical fasteners for installation.

Yet another object of the present invention is a method for constructing an upholstery pad for facing interior surfaces of a vehicle which requires a reduced number of mechanical fasteners for installation.

These and other objects are attained by an upholstery pad comprising a panel having a front surface, a back surface, and a plurality of edges extending from the front surface to the back surface. The panel further has a fixed portion and a first flap, the first flap being divided from the fixed portion along a first hinging axis, the first flap being continuously pivotable about the first hinging axis between a first relaxed position and a first biased position. The upholstery pad further comprises a padding member having a front surface and a back surface, at least a portion of the back surface of the padding member being adhesively attached to the front surface of the panel, wherein the padding member extends across the first hinging axis. The upholstery pad also comprises a sheet having a front surface and a back surface, at least a portion of the back surface of the sheet being adhesively attached to the front surface of the padding member. Pivoting the first flap about the first hinging axis away from the first relaxed position and toward the first biased position causes a first force to be produced which urges the first flap to be pivoted about the first hinging axis toward the first relaxed position.

When the upholstery pad is installed, the vehicle cab substructure is used to pivot the portion of the upholstery pad having the flap toward the biased position. Mechanical fasteners, if used, are inserted into attachment holes generated in the portion of the upholstery pad having the fixed portion of the panel and are engaged with the substructure. The mechanical fasteners hold the fixed portion, and thus that portion of the upholstery pad, in place. The force applied to the substructure by the flap, in combination with friction between the sheet and the substructure, holds the end of the upholstery pad having the flap in place without the use of other fastening means.

An upholstery pad of the present invention may have a plurality of flaps and may or may not use mechanical fasteners to fasten the portion of the upholstery pad having the fixed portion of the panel to the substructure.

BRIEF DESCRIPTION OF THE DRAWINGS

Other advantages and features of the invention will become more apparent with reference to the following detailed description of the invention in connection with the accompanying drawings, wherein like reference numerals have been applied to like elements, in which.

DETAILED DESCRIPTION OF THE INVENTION

Figure 1:
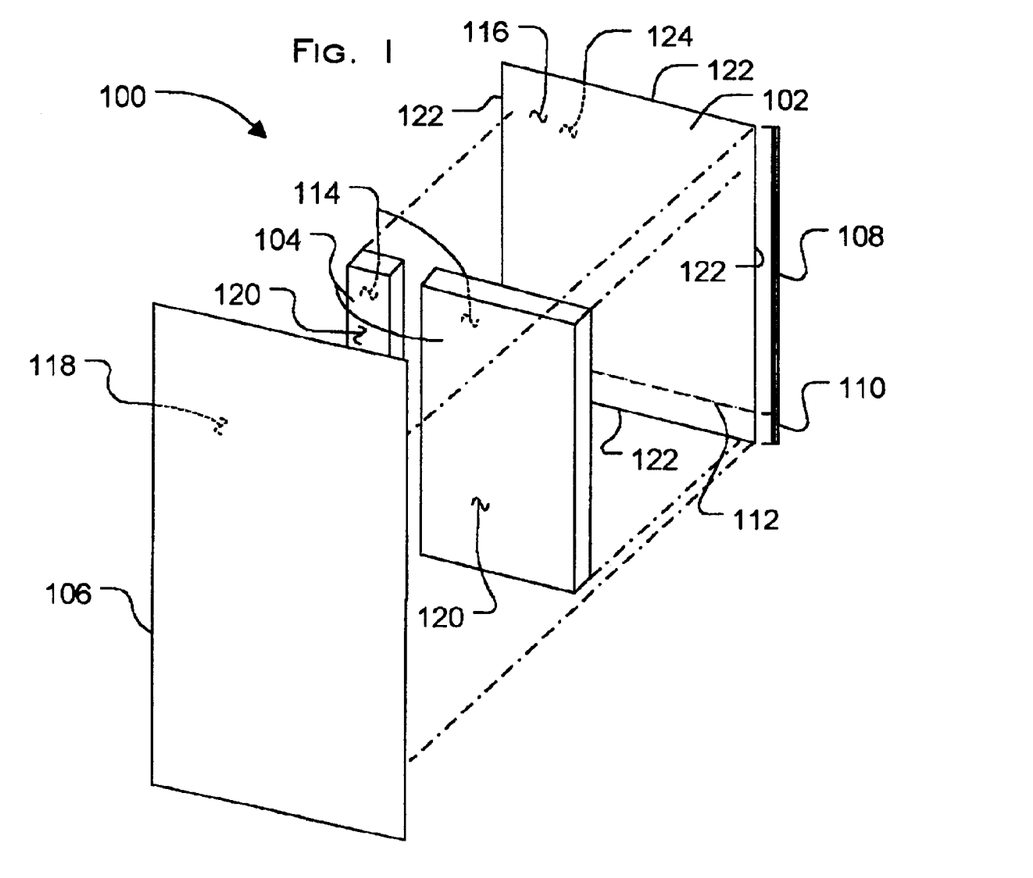
FIG. 1 is an exploded perspective view of a first embodiment of the present invention.

Referring to the drawings, and FIG. 1 in particular, shown therein are components of an upholstery pad 100 of the present invention. The upholstery pad 100 comprises a panel 102, which provides support for the upholstery pad 100; one or more padding members 104; a sheet 106 of vinyl, fabric or other upholstery-type covering material; and one or more adhesive materials to secure the components together. The panel 102 has a fixed portion 108 and a flap 110 which are divided along a hinging axis 112. The panel 102 is perforated, scored, or separated along a path which is parallel to a hinging axis 112 so that the flap 110 is continuously pivotable about the hinging axis 112.

Figure 2:
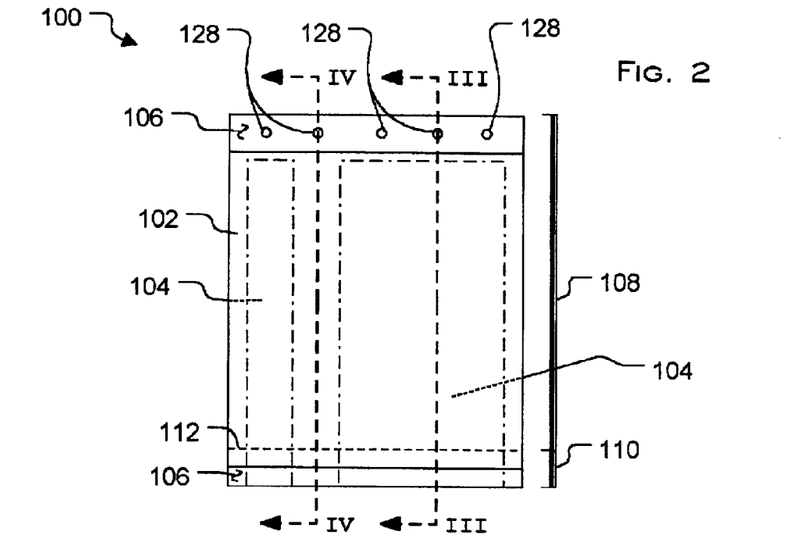
FIG. 2 is a rear view of the first embodiment of the present invention showing in a relaxed flap position.
Figure 3:
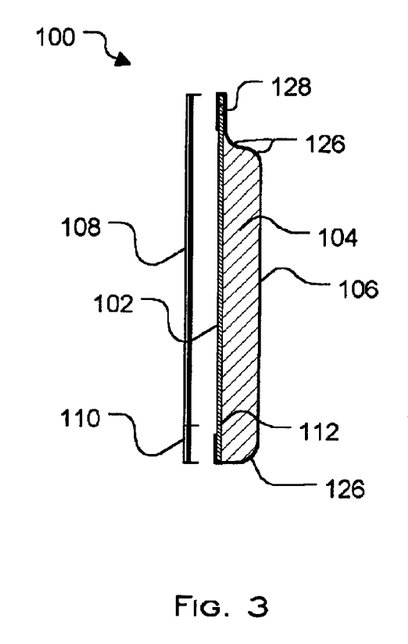
FIG. 3 is a cross-sectional view of the first embodiment of the present invention taken along the III—III line in FIG. 2.
Figure 4:
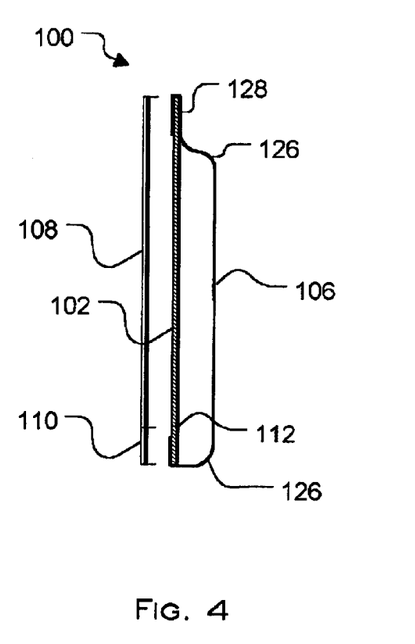
FIG. 4 is a cross-sectional view of the first embodiment of the present invention taken along the IV—IV line in FIG. 2.

Referring now to FIGS. 2–4, shown therein is the assembled upholstery pad 100 of FIG. 1. The padding members 104 extend between and are adhesively attached to the panel 102 and the sheet 106. The sheet 106 is tensioned across the padding members 104, which locally compresses the padding members 104 and thus causes the corner areas 126 to become rounded. The sheet 106, which is adhesively attached to areas on the front surface of the panel 102 that are not covered by the padding members 104, extends around the edges of the panel 102 and is attached to the back surface 124 (see FIG. 1) of the panel 102. Attachment holes 128 are provided in the upholstery pad 100 so that mechanical fasteners can be inserted therein to attach the fixed portion 108 to a substructure.

Figure 5:
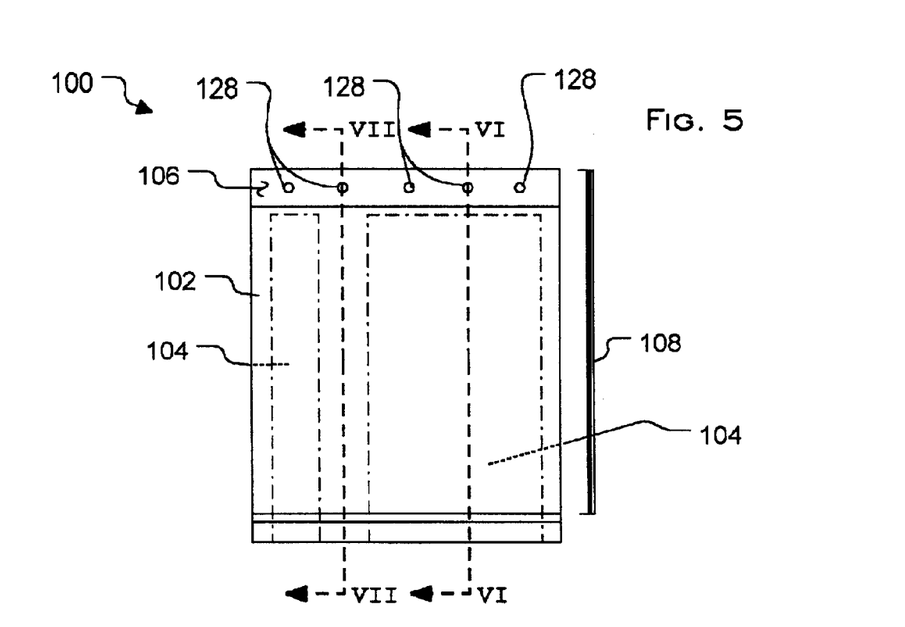
FIG. 5 is a rear view of the first embodiment of the present invention showing a biased flap position.
Figure 6:
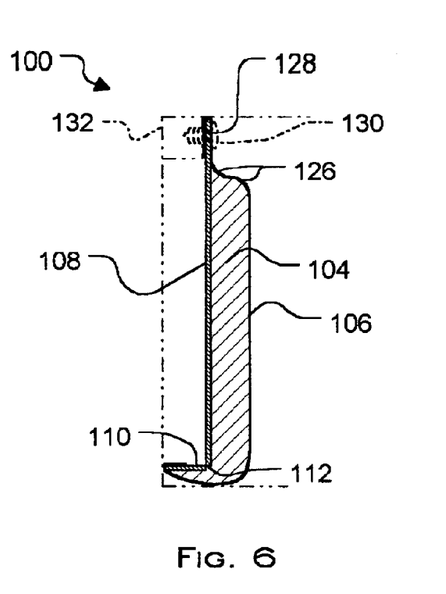
FIG. 6 is a cross-sectional view of the first embodiment of the present invention taken along the VI—VI line in FIG. 5.
Figure 7:
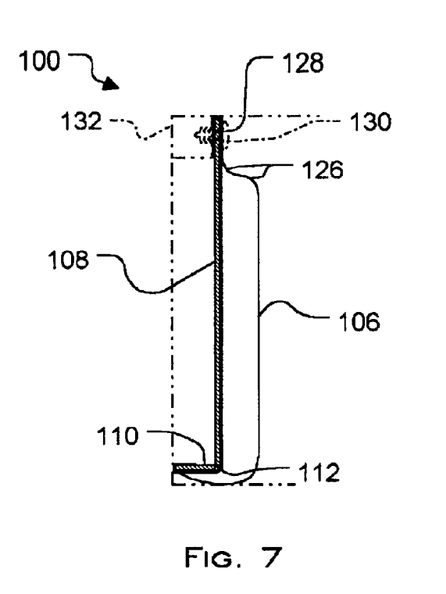
FIG. 7 is a cross-sectional view of the first embodiment of the present invention taken along the VII—VII line in FIG. 5.

The upholstery pad 100 is shown in FIGS. 2–4 in a relaxed configuration, as the flap 110 has no forces external to the upholstery pad 100 acting on it. In this configuration, the flap 110 is substantially coplanar with the fixed portion 108. In FIGS. 5–7, the upholstery pad 100 is shown in a biased configuration, as the flap 110 is pivoted about the hinging axis 112 to a biased position and is not substantially coplanar with the fixed portion 108. As the flap 110 is pivoted about the hinging axis 112, the padding members 104 which extend across the hinging axis 112 become compressed, thus acting as springs which urge the flap 110 to be pivoted about the hinging axis 112 back toward the relaxed configuration shown in FIG. 24. When the upholstery pad 100 is installed as shown in FIGS. 6 and 7, mechanical fasteners 130 are inserted into each of the holes 128 and are engaged with the substructure 132. The mechanical fasteners 130 hold the fixed portion 108, and thus that portion of the upholstery pad 100, in place. The force applied to the substructure 132 by the flap 110, in combination with friction between the sheet 106 and the substructure 132, holds the end of the upholstery pad 100 having the flap 110 in place without the use of other fastening means.

Figure 8:
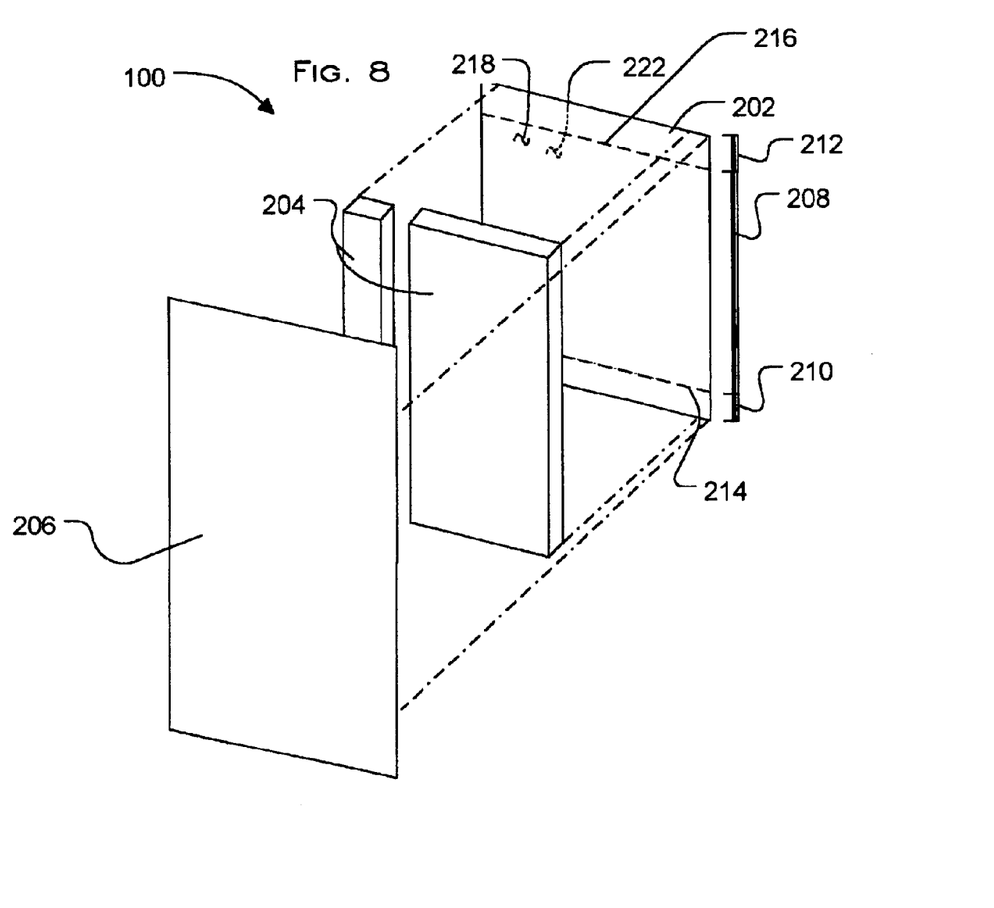
FIG. 8 is an exploded perspective view of a second embodiment of the present invention.

Referring now to FIG. 8, a second embodiment of the present invention is shown comprising a panel 202, one or more padding members 204, and a sheet 206. The panel 202 is divided into a fixed portion 208, a first flap 210, and a second flap 212. The first flap 210 is separated from the fixed portion 208 by a first hinging axis 214, and the second flap is separated from the fixed portion 208 by a second hinging axis 216. As in the first embodiment (FIG. 1), the padding members 204 are adhesively attached to the front surface 218 of the panel 202 and, in this embodiment, at least one of the padding members extends across the first hinging axis 214 and at least one of the padding members extends across the second hinging axis 216. In other respects, the second embodiment, as shown in FIG. 8, is the same as the first embodiment, as shown in FIG. 1.

Figure 9:
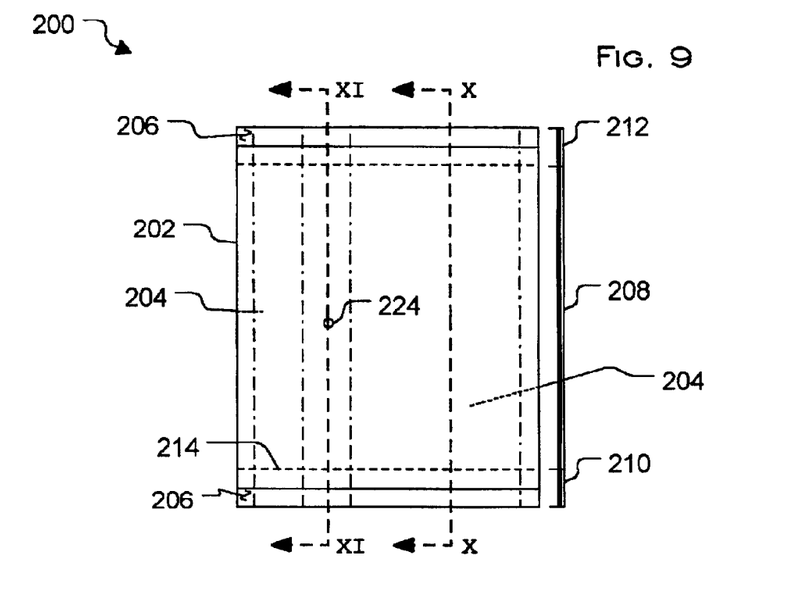
FIG. 9 is a rear view of the second embodiment of the present invention showing relaxed flap positions.
Figure 10:
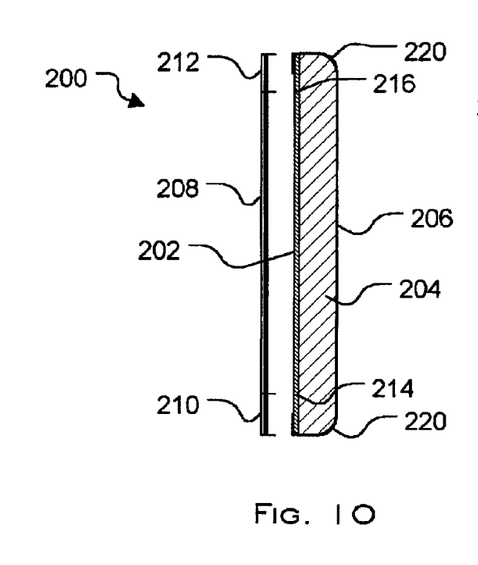
FIG. 10 is a cross-sectional view of the second embodiment of the present invention taken along the X—X line in FIG. 9.
Figure 11:
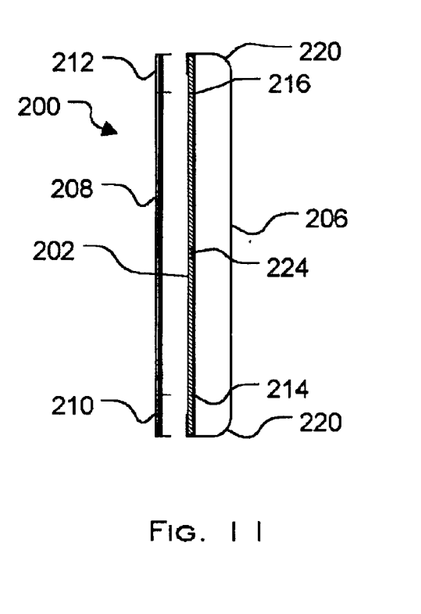
FIG. 11 is a cross-sectional view of the second embodiment of the present invention taken along the XI—XI line in FIG. 9.

Calling attention now to FIGS. 9–11, shown therein is the assembled upholstery pad 200 of FIG. 8. As in the first embodiment, the padding members 204 extend between and are adhesively attached to the panel 202 and the sheet 206. The sheet 206 is stretched across the padding members 204, which locally compresses the padding members 204 and which causes the corner areas 220 to become rounded. The sheet 206, which is adhesively attached to areas on the front surface 218 of the panel 202 that are not covered by the padding members 204, extends around the edges of the panel 202 and is attached to the back surface 222 of the panel 202. An attachment hole 224 is provided in upholstery pad 200 so that a mechanical fastener can be inserted therein to attach the fixed portion 208 to a substructure 228. This embodiment of the present invention does not require that the fixed portion 208 be mechanically fastened to a substructure 228, but the fixed portion 208 may be mechanically fastened to a substructure 228 at one or more points as desired.

Figure 12:
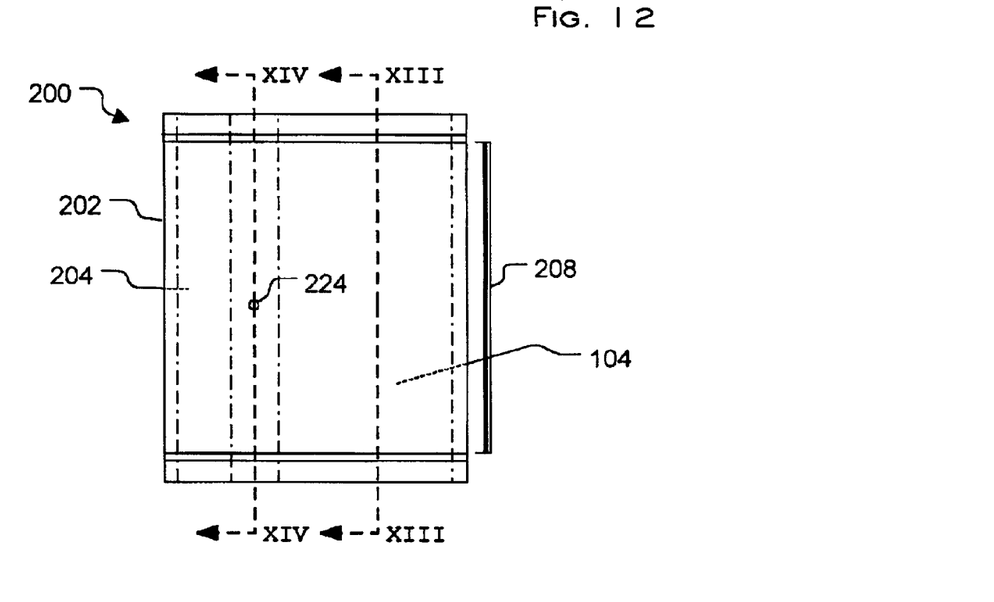
FIG. 12 is a rear view of the second embodiment of the present invention showing biased flap positions.
Figure 13:
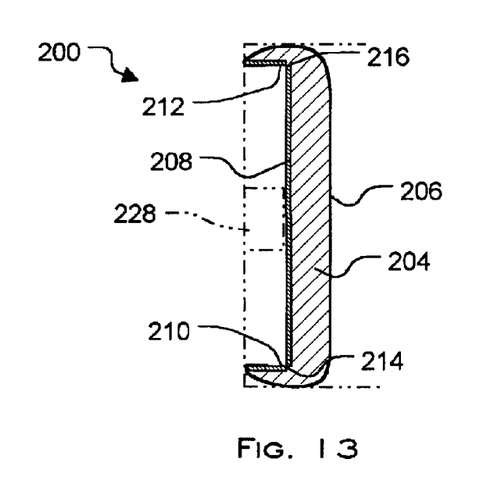
FIG. 13 is a cross-sectional view of the second embodiment of the present invention taken along the XIII—XIII line in FIG. 12.
Figure 14:
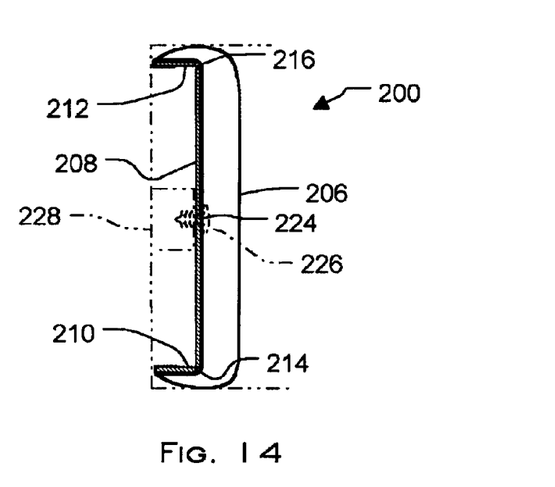
FIG. 14 is a cross-sectional view of the second embodiment of the present invention taken along the XIV—XIV line in FIG. 12.
Figure 15:
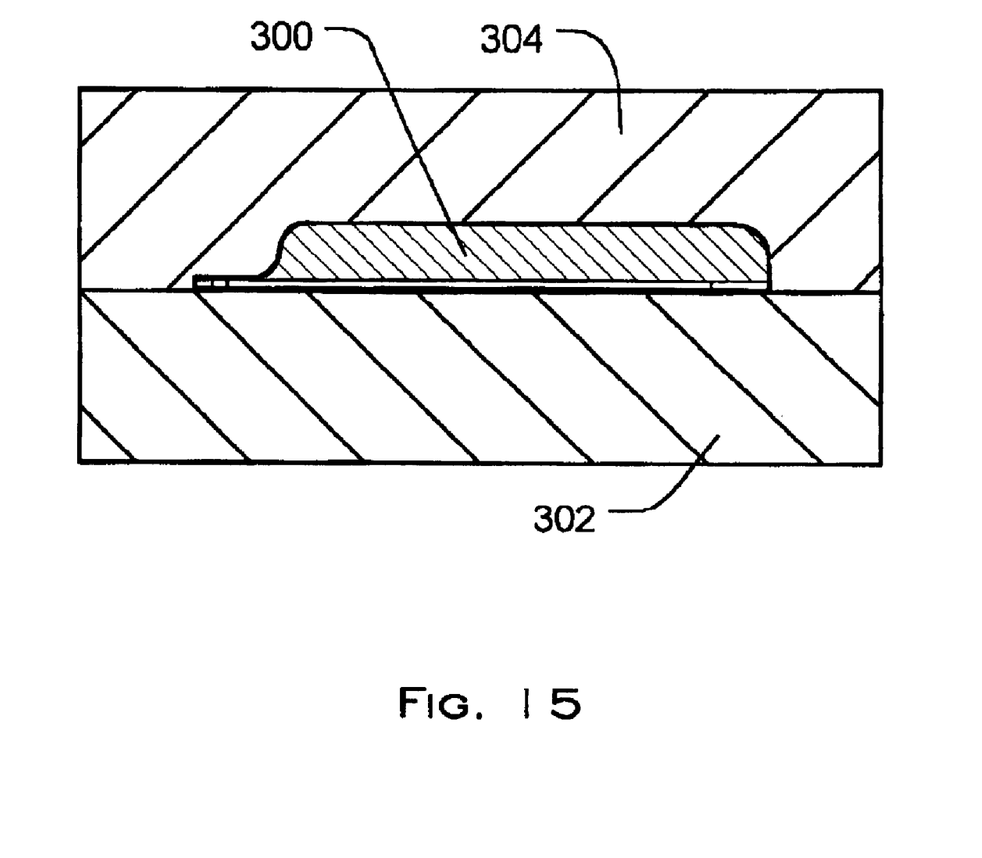
FIG. 15 is a cross-sectional view of a pair of heatable platens and an upholstery pad of the present invention captured therebetween.

The upholstery pad 200 is shown in FIGS. 10 and 11 in a relaxed configuration, as the flaps 210 and 212 have no forces external to the upholstery pad 200 acting on them. In this configuration, the flaps 210 and 212 are substantially coplanar with the fixed portion 208. In FIGS. 12–14, the upholstery pad 200 is shown in a biased configuration, as the flaps 210 and 212 are pivoted about the first hinging axis 214 and the second hinging axis 216 to biased positions and are not substantially coplanar with the fixed portion 208. As the flaps 210 and 212 are pivoted about the hinging axes 214 and 216, respectively, the padding members 204 which extend across the hinging axes 212 and 214 become compressed, thus acting as springs which urge the flaps 210 and 212 to be pivoted about the hinging axes 214 and 216, respectively, back toward the relaxed configuration shown in FIGS. 10 and 11. When the upholstery pad 200 is installed as shown in FIGS. 13 and 14, a mechanical fastener 226 is inserted into the hole 224 and is engaged with the substructure 228. In this example, the mechanical fastener 226 holds the fixed portion 208, and thus that portion of the upholstery pad 200, in place; however, no attachment hole 224 or mechanical fastener 226 is required in this embodiment of the present invention. The force applied to the substructure 228 by the flaps 210 and 212, in combination with friction between the sheet 206 and the substructure 228, holds the ends of the upholstery pad 200 having the flaps 210 and 212 in place without the use of other fastening means.

In these embodiments, the panels 102 and 202 are typically made of solid cardboard having a thickness of about 2 mm (0.08 in) but can be made of other materials and have other thicknesses. The padding members 104 and 204 are typically made of open-celled foam having thicknesses from about 9–38 mm (⅜–1½ in); however, padding members 104 and 204 made of other materials and thicknesses can also be used. The sheets 106 and 206 of the embodiments disclosed herein are made of vinyl, fabric, or any other suitable upholstery material.

Various embodiments of the methods of construction of the present invention are described herein with reference to the first upholstery pad embodiment shown in FIGS. 1–7; however, the second upholstery pad embodiment, shown in FIGS. 8–14, can also be constructed according to the methods of construction disclosed herein.

Referring now to FIGS. 1–7 and 15, a first method of constructing an upholstery panel according to the present invention comprises providing a panel 102, one or more padding members 104, and a sheet 106. A hinge is created along a hinging axis 112 to divide a flap 110 from a fixed portion 108 of the panel 102 so that the flap 110 is continuously pivotable about the hinging axis 112 between a relaxed position and a biased position. The hinge can be created by perforating or scribing the panel 102 along a path parallel to the hinging axis 112 or by separating the flap 110 from the fixed portion 108 along a path parallel to the hinging axis 112. The padding members 104 are immersed into a bath of adhesive resin, to saturate the padding members 104 with adhesive resin, and the excess resin is removed from the padding members 104. The padding members 104 are placed onto a predetermined location on the front surface 116 of the panel 102 so that at least one of the padding members 104 extends across the hinging axis 112 and so that at least a portion of the back surface 114 of the padding members 104 is in contact with the front surface 116 of the panel 102. The sheet 106 is draped over the front surface 120 of the padding members 104 and the front surface 116 of the panel 102 to produce an upholstery pad assembly 300, wherein at least a portion of the back surface 118 of the sheet 106 is in contact with the front surface 120 of at least one of the padding members 104. The upholstery pad assembly 300 is placed onto a first heatable platen 302 of a press having at least the first heatable platen 302 and a second heatable platen 304. The heatable platens 302 and 304 are mated so as to capture the upholstery pad assembly 300 between the platens 302 and 304. The upholstery pad assembly 300 is held between the platens 302 and 304 for a predetermined period of time and at a predetermined temperature or temperatures to create a bonded upholstery pad assembly. The first heatable platen 302 is separated from the second heatable platen 304 and the bonded upholstery pad assembly is removed therefrom. The sheet 106 can also be attached to the edges 122 of the panel 102 and can be attached to the back surface 124 of the panel 102. Excess of the sheet 106 can be trimmed after removal from the heatable platens 302 and 304. If attachment holes 128 are desirable, they are generated by drilling, punching, piercing, or other hole-generating processes.

If the upholstery pad has a plurality of flaps, a plurality of hinges are created corresponding to each of the plurality of flaps.

A second method of constructing an upholstery panel according to the present invention comprises adhesively attaching the components as described in the first method by using any adhesive attachment process suitable and without the use of heatable platens.

Although the present invention has been described with referenced to a presently preferred embodiment, it will be appreciated by those skilled in the art that various modifications, alternatives, variations, etc., may be made without departing from the spirit and scope of the invention as defined in the appended claims.

What is claimed is:

1. An upholstery pad, comprising:
    a panel having a front surface, a back surface, and a plurality of edges extending from said front surface to said back surface, said panel further having a fixed portion, a first hinge and a first flap, said first flap being divided from said fixed portion by said first hinge, said first flap being continuously pivotable about said first hinge between a first relaxed position and a first biased position, said first hinge being defined by a path of greater flexibility relative to portions of the panel not included in said path so as to provide a predetermined hinging position;
    a padding member having a front surface and a back surface, at least a portion of said back surface of said padding member being adhesively attached to said front surface of said panel, wherein said padding member extends across said first hinge; and
    a sheet having a front surface and a back surface, at least a portion of said back surface of said sheet being adhesively attached to said front surface of said padding member, said sheet extending across opposing edges of the panel and being adhesively attached to respective adjacent portions of said back surface of the panel,
    wherein pivoting said first flap about said first hinge away from said first relaxed position and toward said first biased position causes a first force to be produced which assists in maintaining an installed position of the pad by urging said first flap to be pivoted about said first hinge toward said first relaxed position.

2. An upholstery pad, according to claim 1, wherein said first force is at least partially caused by said padding member being placed in tension when said first flap is pivoted about said first hinge away from said first relaxed position and toward said first biased position.

3. An upholstery pad, according to claim 1, wherein said fixed portion is mechanically fastened to a substructure.

4. An upholstery pad, according to claim 3, wherein said sheet extends across and is adhesively attached to each of said edges of said panel and extends onto and is adhesively attached to said back surface of said panel.

5. An upholstery pad, according to claim 3, wherein said first hinge comprises a portion of said panel where said panel is perforated.

6. An upholstery pad, according to claim 3, wherein said first hinge comprises a portion of said panel where said first flap is detached from said fixed portion.

7. An upholstery pad, according to claim 3, wherein said first hinge comprises a portion of said panel where said front surface of said panel is scored.

8. An upholstery pad, according to claim 3, wherein said fixed portion of said panel is fastened to said substructure by at least one push fastener.

9. An upholstery pad, according to claim 1, wherein said panel having a second flap, said second flap being continuously pivotable, with respect to said fixed portion, along a second hinge between a second relaxed position and a second biased position;
    wherein a portion of said padding member extends across at least a portion of said second hinge; and
    wherein pivoting said second flap about said second hinge from said second relaxed position toward said second biased position causes a second force to be produced which urges said second flap to be pivoted about said second hinge toward said second relaxed position.

10. An upholstery pad, according to claim 9, wherein said second force is at least partially caused by said padding member being placed in tension when said second flap is pivoted about said second hinge away from said second relaxed position and toward said second biased position.

11. An upholstery pad, according to claim 9, wherein said sheet extends across and is adhesively attached to each of said edges of said panel and extends onto and is adhesively attached to said back surface of said panel.

12. An upholstery pad, according to claim 9, wherein said second hinge comprises a portion of said panel where said panel is perforated.

13. An upholstery pad, according to claim 9, wherein said second hinge comprises a portion of said panel where said second flap is detached from said fixed portion.

14. An upholstery pad, according to claim 9, wherein said second hinge comprises a portion of said panel where said front surface of said panel is scored.

15. An upholstery pad, according to claim 9, wherein said fixed portion is mechanically fastened to a substructure.

16. An upholstery pad, according to claim 15, wherein said fixed portion of said panel is fastened to said substructure by at least one push fastener.

17. An upholstery pad as in claim 1, wherein said fixed portion is substantially rigid.

18. An upholstery pad for mounting on a substructure, comprising:
   a panel having a front surface, a back surface, and a plurality of edges extending from said front surface to said back surface, said panel further having a fixed portion, a first hinge and a first flap, said first flap being divided from said fixed portion along said first hinge, said first flap being continuously pivotable about said first hinge between a first relaxed position and a first biased position, said first hinge being defined by a path of greater flexibility relative to portions of the panel not included in said path so as to provide a predetermined hinging position;
   a padding member having a front surface and a back surface, at least a portion of said back surface of said padding member being adhesively attached to said front surface of said panel, wherein said padding member extends across said first hinge; and
   a sheet having a front surface and a back surface, at least a portion of said back surface of said sheet being adhesively attached to said front surface of said padding member, said sheet extending across opposing edges of the panel and being adhesively attached to respective adjacent portions of said back surface of the panel,
   wherein pivoting said first flap about said first hinge away from said first relaxed position and toward said first biased position causes a first force to be produced which urges said first flap to be pivoted about said first hinge toward said first relaxed position and wherein said first flap is positioned in said first biased position when said upholstery pad is positioned in said substructure such that said upholstery pad is maintained in position in said substructure by a frictional force between said upholstery pad and said substructure, wherein the frictional force is due at least in part to said first force.

19. An upholstery pad, according to claim 18, wherein said first force is at least partially caused by said padding member being placed in tension when said first flap is pivoted about said first hinge away from said first relaxed position and toward said first biased position.

20. An upholstery pad, according to claim 19, wherein said first hinge comprises a portion of said panel where said panel is perforated.

21. An upholstery pad, according to claim 19, wherein said first hinge comprises a portion of said panel where said first flap is detached from said fixed portion.

22. An upholstery pad, according to claim 19, wherein said first hinge comprises a portion of said panel where said front surface of said panel is scored.

23. An upholstery pad, according to claim 19, wherein said fixed portion of said panel is fastened to said substructure by at least one push fastener.

24. An upholstery pad, according to claim 18, wherein said fixed portion is mechanically fastened to said substructure.

25. An upholstery pad, according to claim 24, wherein said sheet extends across and is adhesively attached to each of said edges of said panel and extends onto and is adhesively attached to said back surface of said panel.

26. An upholstery pad, according to claim 18, wherein said panel having a second flap, said second flap being continuously pivotable, with respect to said fixed portion, along a second hinge between a second relaxed position and a second biased position;
   wherein a portion of said padding member extends across at least a portion of said second hinge; and
   wherein pivoting said second flap about said second hinge from said second relaxed position toward said second biased position causes a second force to be produced which urges said second flap to be pivoted about said second hinge toward said second relaxed position.

27. An upholstery pad, according to claim 26, wherein said second flap is positioned in said second biased position when said upholstery pad is positioned in said substructure such that said upholstery pad is maintained in position in said substructure by a frictional force between said upholstery pad and said substructure by said second force.

28. An upholstery pad, according to claim 26, wherein said second force is at least partially caused by said padding member being placed in tension when said second flap is pivoted about said second hinge away from said second relaxed position and toward said second biased position.

29. An upholstery pad, according to claim 26, wherein said sheet extends across and is adhesively attached to each of said edges of said panel and extends onto and is adhesively attached to said back surface of said panel.

30. An upholstery pad, according to claim 26, wherein said second hinge comprises a portion of said panel where said panel is perforated.

31. An upholstery pad, according to claim 26, wherein said first hinge comprises a portion of said panel where said second flap is detached from said fixed portion.

32. An upholstery pad, according to claim 26, wherein said first hinge comprises a portion of said panel where said front surface of said panel is scored.

33. An upholstery pad, according to claim 26, wherein said fixed portion is mechanically fastened to a substructure.

34. An upholstery pad, according to claim 33, wherein said fixed portion of said panel is fastened to said substructure by at least one push fastener.

35. An upholstery pad, according to claim 18, wherein said fixed portion is substantially rigid.

36. An upholstery pad, according to claim 1, wherein the sheet is a fabric sheet.

37. An upholstery pad, according to claim 1, wherein the panel is a cardboard panel.

38. An upholstery pad, according to claim 1, wherein the sheet is tensioned between said opposing edges of the panel.

39. An upholstery pad, according to claim 18, wherein the sheet is a fabric sheet.

40. An upholstery pad, according to claim 18, wherein the panel is a cardboard panel.

41. An upholstery pad, according to claim 18, wherein the sheet is tensioned between said opposing edges of the panel.

* * * * *